United States Patent [19]

Yoshino

[11] Patent Number: 5,514,745
[45] Date of Patent: May 7, 1996

[54] MIXTURE FOR MELT PROCESS MOLDINGS HAVING LONG FIBER REINFORCED POLYPROPYLENE AND POLYPROPYLENE RESIN AND HIGH MECHANICAL STRENGTH MOLDING FORMED THEREFROM

[75] Inventor: Kenji Yoshino, Tokyo, Japan

[73] Assignee: Kawasaki Steel Corporation, Japan

[21] Appl. No.: 362,830

[22] Filed: Dec. 23, 1994

[30] Foreign Application Priority Data

Dec. 28, 1993 [JP] Japan .................................. 5-336304

[51] Int. Cl.$^6$ ............................. C08J 5/08; C08K 3/40; C08L 23/12
[52] U.S. Cl. ........................ 524/494; 524/492; 524/493; 523/348; 523/351
[58] Field of Search ..................... 524/494, 492, 524/493; 523/348, 351

[56] References Cited

U.S. PATENT DOCUMENTS 5,030,682  7/1991  Nomura et al. ........................ 524/522
5,286,776  2/1994  Ichikawa et al. ...................... 524/449

Primary Examiner—Paul R. Michl
Assistant Examiner—U. K. Rajguru
Attorney, Agent, or Firm—Austin R. Miller

[57] ABSTRACT

A mixture for melt process moldings, and a molding formed of the mixture. The mixture consists essentially of about 5 to about 70 wt % of a master batch prepared in the form of pellets formed by cutting a long glass fiber reinforced polypropylene resin, and about 30 to about 95 wt % of polypropylene resin. The long glass fiber reinforced polypropylene resin is prepared in such a manner that a bundle of continuous reinforcement glass fibers surface-finished with a finishing agent containing a coupling agent is impregnated with a modified polypropylene resin having a functional group capable of chemically bonding with the coupling agent and having a melt flow rate of about 70 to about 300 g/10 min (ASTM D-1238, load: 2.16 kg, temperature: 230° C.) while the bundle of glass fibers is being drawn. The pellets have a length of about 2 to about 50 mm in the direction along the fibers. The glass fibers in the pellets extend uniformly in parallel with each other through a distance substantially equal to the length of the pellets. The pellets have a glass fiber content of about 60 to about 90 wt %.

18 Claims, No Drawings

MIXTURE FOR MELT PROCESS MOLDINGS HAVING LONG FIBER REINFORCED POLYPROPYLENE AND POLYPROPYLENE RESIN AND HIGH MECHANICAL STRENGTH MOLDING FORMED THEREFROM

BACKGROUND OF THE INVENTION

1. Field of the Invention

The present invention relates to a molding mixture for forming a long glass fiber reinforced polypropylene molding having high mechanical strength and to a molding formed of the molding mixture.

2. Description of the Related Art

Glass fiber reinforced polypropylene resins have been widely used for various industrial product components because they possess excellent mechanical strength, heat resistance and formability. Glass fiber reinforced polypropylene resins obtained by a drawing process in which continuous fibers are impregnated with a resin while being drawn (hereinafter referred to as "long" fiber reinforced polypropylene resins) exhibit superior impact strength, creep characteristics and vibration fatigue characteristics over glass fiber reinforced polypropylene resins obtained by kneading chopped strands and a resin with an extruder or molding machine (hereinafter referred to as "short" fiber reinforced polypropylene resins). Long fiber reinforced polypropylene resins produced by a drawing method also enables the binding of glass fibers at a very high density, because the glass fibers extend in a single direction in a bound state.

It is difficult to produce a short fiber reinforced polypropylene resin by kneading the resin with an extruder if the glass fiber content exceeds 50% by weight. On the other hand, long glass fiber reinforced polypropylene resin is easily produced by a drawing method even if the glass fiber content is 80% or higher by weight. Due to this advantage, long fiber reinforced polypropylene resins produced by drawing and having a large glass fiber content are frequently utilized as a master batch. When long fiber reinforced polypropylene resin possessing large glass fiber content is used as a master batch, the range from which the proportion of a diluting polypropylene mixed in the long fiber reinforced polypropylene resin is selected increases and, accordingly, melt process moldings of long fiber reinforced polypropylene having various fiber contents which are suitable for various kinds of use or purposes can be obtained. Thus, the use of long fiber reinforced polypropylene resins is economical because of their wide product application range.

However, long fiber reinforced polypropylene resins produced by drawing to be used as a master batch have drawbacks in that it is difficult to completely impregnate several thousands or several tens of thousands of glass fiber filaments with a polypropylene resin while drawing the filaments. Another drawback is that hydrophilic glass fibers have low wettability with non-polar polypropylene resins. Methods for reducing these drawbacks have been disclosed, as described below.

For example, Japanese Patent Laid-Open Publication 17631/1993 discloses a method of using a low-viscosity polypropylene of a melt flow rate of 30 g/10 min or higher measured by ASTM method D-1238 (load: 2.16 kg, temperature: 230° C.) to facilitate molten resin impregnation, Japanese Patent Publication No. 25340/1991 discloses a method of impregnating glass fibers with a resin having a very small molecular weight, and Japanese Patent Laid-Open Publication No. 181528/1991 discloses a method of finishing the surface of glass fibers and using a modified polypropylene to improve the wettability.

Methods for obtaining moldings by a master batch process have also been disclosed, as described below.

Japanese Patent Laid-Open Publication No. 241406/1989 discloses a method of molding a dry blend of a long fiber reinforced thermoplastic resin and a thermoplastic resin having no long fibers, Japanese Patent Laid-Open Publication No. 114705/1991 discloses a method of using a polypropylene resin of a melt flow rate of 20 to 60 g/10 min or higher and pellets having a small size, i.e., a shape in which the length of at least one side is 1 mm or less and the specific surface area is 20 $cm^2$/g or larger, and Japanese Patent Laid-Open Publication No. 20339/1984 discloses a method of heating a combined filament yarn fabric of glass fiber and modified polypropylene fiber.

However, in prior art processes using a long glass fiber reinforced polypropylene resin as a master batch, a molding obtained by diluting such a resin and by molding the mixture tends to decrease in strength as glass fiber content increases. This tendency intensifies when the glass fiber content exceeds about 60% by weight.

The above-described prior art has been discussed with respect to impregnation techniques, particularly, methods for increasing fiber content, improving wettability, and obtaining moldings from master batches.

However, the above-described problems experienced when using a long glass fiber reinforced polypropylene resin as a master batch have not been addressed by the prior art and thus no method for solving the problem has been disclosed. If the problem of strength reduction in a molding obtained by using such a master batch is solved, moldings of long glass fiber reinforced polypropylene resins which satisfy the requirements for a wide array of uses and purposes could be produced at a low cost.

SUMMARY OF THE INVENTION

Accordingly, an object of the present invention is to provide a mixture for melt process moldings which consists of a long glass fiber reinforced polypropylene master batch and a polypropylene resin and which is capable of forming a high-strength molding, and a molding formed of such a mixture.

In order to solve the above-described problem, the inventors of the present invention conducted various studies of melt process molding mixtures and moldings subsequently formed, each mixture consisting of a long glass fiber reinforced polypropylene master batch and a polypropylene resin used to form a high-strength molding. From the studies, the factors found to be most vital to success are:

uniform dispersion of glass fibers in a master batch produced by drawing;

sufficiently high adhesion of interface between glass fibers and a polypropylene resin in a master batch; and maintaining matrix resin viscosity in a master batch within a particular range to reduce the apparent viscosity of the entire master batch and to ensure the desired strength.

Based on the above-described findings, the inventors found that a melt process molding formed of a mixture of a long glass fiber reinforced polypropylene resin master batch and a polypropylene resin can be obtained with suitable glass fiber dispersion, excellent surface appearance and outstanding strength only if the glass fiber and the resins are prepared under particular conditions.

In preparing a long glass fiber reinforced polypropylene having high mechanical strength, a polypropylene of high mechanical strength, in other words, having high molecular weight and a low melt flow rate, have been preferred as a matrix even when wettability and adhesion have been improved by finishing the surface of glass fibers and by using a chemical bond formed by a modification of polypropylene as described above.

On the other hand, for uniform dispersion of long glass fibers as a reinforcement member in a matrix, it is necessary to impregnate a bundle of glass fibers consisting of several thousands to several tens of thousands of filaments with polypropylene. In such a case, a polypropylene having high fluidity, i.e., a high melt flow rate, is more preferable because of its high permeability. Thus, there is a dichotomy with respect to matrix polypropylenes.

Japanese Patent Laid-Open No. 114705/1991 discloses a master batch in which a polypropylene having very high fluidity in comparison with the conventional matrix polypropylene, i.e., a melt flow rate of 60 g/10 min (20 to 60 g/10 min), is used as a matrix to achieve a large glass fiber content, and which is formed into a plate-like shape for improved heat conductivity. In the present technical field, it is commonly believed that in using such a highly fluid master batch matrix polypropylene resin, strength is sacrificed.

The inventors conducted an experiment in which, as described below with respect to Comparative Example 4, a master batch possessing a large fiber content and produced in the shape of pellets was drawn using a polypropylene having a melt flow rate of 60 g/10 min as a matrix, mixed with a diluting polypropylene and thereafter melted and molded. It was confirmed that even in this master batch the apparent viscosity was very high and the glass fibers were not easily dispersed through the entire resin.

However, in the course of studying the present invention, the inventors produced a master batch having a large glass fiber content by using as a matrix polypropylene having very low resin strength and markedly high fluidity in comparison with the conventional master batch matrix polypropylene, i.e., a melt flow rate of about 70 to about 300 g/10 min. The strength of this master batch itself was low. However, the inventors also made a melt process molding by mixing this master batch and a diluting polypropylene, and discovered that the strength of this melt process molding was surprisingly larger than that of a conventional melt process molding obtained from a master batch in which a low melt flow rate polypropylene is used.

The present invention provides a mixture for melt process moldings consisting of a long glass fiber reinforced polypropylene resin and another polypropylene resin, and a molding formed of the mixture, the mixture being prepared in such a manner that a bundle of continuous reinforcement glass fibers surface-finished with a finishing agent containing a coupling agent is impregnated with a modified polypropylene resin having a functional group capable of chemically bonding with the coupling agent and having a melt flow rate of about 70 to about 300 g/10 min (ASTM D-1238, load: 2.16 kg, temperature: 230° C.). While the bundle of glass fibers is being drawn, the bundle of glass fibers is cut after the impregnation to form pellets (as a master batch) which have a length of about 2 to about 50 mm in the direction along the fibers, in which the glass fibers uniformly extend in parallel with each other through a distance substantially equal to the length of the pellet, and the mixture being formed of about 5 to about 70 wt % of the master batch and about 30 to about 95 wt % of a polypropylene resin.

The above-described advantages as well as other features and advantages of the present invention will become apparent from the following detailed description of the present invention along with selected variations of the invention.

DETAILED DESCRIPTION OF THE PREFERRED EMBODIMENTS

Embodiments of the present invention will hereinafter be described in detail with reference to specific forms of the invention, but Specific terms used in the specification are not intended to limit the scope of the invention which is described in the appended claims.

Glass fibers used in accordance with the present invention are fibers of E-glass, S-glass, C-glass, AR-glass, T-glass, D-glass, R-glass or the like. Ordinarily, fibers of such glass are provided as a twisted bundle of a plurality of glass filaments i.e., as a glass roving. Glass fibers having a diameter of about 3 to about 40 μm are suitable. If the glass fiber diameter is smaller than about 3 μm, and if the (glass content is fixed, the number of glass fibers is increased such that it is difficult to impregnate the glass fiber bundles with a resin. If the glass fiber diameter is larger than about 40 μm, a considerable deterioration results in the external appearance of a molding. Glass fibers having a diameter within the range of about 9 to about 20 mm are most suitable.

Glass fibers used in accordance with the present invention must be surface-finished with a finishing agent containing a coupling agent. Non-surface-finished glass fibers have a hydrophilic nature and therefore have low wettability with polypropylene resins having a lipophilic nature. As a result, a large surface tension is caused between such glass fibers and polypropylene, and surface-finished glass fibers cannot easily be impregnated with a polypropylene resin. Consequently, masses of glass fibers unimpregnated with the resin in such a molding cause external appearance defects and strength reduction.

The coupling agent for surface finishing may be selected from silane coupling agents, such as aminosilane, epoxysilane, amidosilane, azidosilane and acrylsilane, titanate coupling agents, and mixtures of these. Among these materials, aminosilane or epoxysilane, particularly an aminosilane coupling agent is most suitable.

The finishing agent may also contain components other than the described coupling agents, for example, a binder, which is, preferably, an urethane resin, an epoxy resin, a vinyl acetate resin, or a modified polyolefin or non-modified polyolefin, such as polyethylene or polypropylene modified with (meth)acrylic acid or acid anhydride, and a lubricant, such as a cationic, nonionic, anionic or silicon compound. Preferably, the content of the finishing agent in the glass fibers is about 0.05 to about 3 wt %. If the content of the finishing agent is smaller than about 0.05 wt %, the surface finishing effect is inadequate. If the content of the finishing agent exceeds about 3 wt %, undesirable coloring and a deterioration due to heat can occur in a molding.

A modified polypropylene resin having a functional group capable of chemically bonding with the above-described coupling agent is preferably selected from carboxylic acid-modified polypropylene resins, acid anhydride-modified polypropylene resins and epoxy-modified polypropylene resins. These polypropylene resins can be obtained by melt-kneading a monomer of (meth)acrylic acid, maleic acid, itaconic acid, maleic anhydride, citraconic anhydride, itaconic anhydride (meth)acrylic acid glycidyl ester or the like with a polypropylene resin under the presence of a radical initiator in an extruder.

The content of the functional group capable of bonding with the coupling agent in the modified polypropylene resin is, preferably, about 0.01 to about 5wt % in terms of the content of a modification monomer. If the content of the functional group is smaller than about 0.01 wt %, the amount of polymer grafted on the glass surface is insufficient, resulting in a reduction in the strength of a molding. If the content of the functional group is larger than about 5 wt %, coloring, i.e., a reduction in heat resistance strength, occurs in the molding. A maleic anhydride-modified polypropylene resin grafted with about 0.02 to about 1.5 wt % of maleic anhydride is most suitable.

The above-described modified polypropylene resin may comprise a single modified polypropylene resin or a mixture of non-modified polypropylene resin and modified polypropylene resin. The mixture of the latter case is also considered a modified polypropylene resin and is included within the scope of the present invention. However, any mixture proportion of polypropylene resins should suffice as long as the total melt flow rate falls within the range of about 70 to about 300 g/10 min.

The modified polypropylene resin comprises a polypropylene resin grafted with a modification monomer, as described above. However, polypropylene resins referred to herein comprise those containing about 70 wt % or more of polypropylene in polymer chains. Examples include: propylene homopolymer; and copolymers containing less than about 30 wt % of vinyl groups containing monomers copolymerizable with propylene and about 70 wt % or more of propylene. Examples of such copolymers are propylene-ethylene random and block copolymers, propylene-butene copolymers, and propylene-EPDM copolymers.

One or a mixture of two or more of these modified polypropylene resins may be used. Examples of the modified polypropylene resin most preferred include polypropylene homopolymer modified with about 0.02 to about 1.5 wt % of maleic anhydride and an ethylene-propylene copolymer modified with about 0.02 to about 1.5 wt % of maleic anhydride and having an ethylene content of about 5 wt % or less.

According to the present invention, glass fibers are surface-finished with a finishing agent containing a coupling agent and a modified polypropylene resin is used as an impregnation resin. The polypropylene resin is thereby grafted to the finishing agent on the glass fiber surface so that the strength of the interface between the glass fiber and the polypropylene matrix resin is increased and the strength of a molding formed from these materials is markedly increased.

It is necessary for the modified polypropylene resin formed as a matrix resin of a master batch in accordance with the present invention to have a melt flow rate in the range of about 70 g/10 min to about 300 g/10 min as measured by ASTM method D-1238 (load: 2.16 kg, temperature: 230° C.) (all melt flow rates shown below are values measured by the same method). If the melt flow rate is lower than about 70 g/10 min, glass fibers are not uniformly dispersed when a mixture of the master batch and a polypropylene resin is melted and molded. As result, non-uniform glass fiber density exists in the molding obtained, and low molding strength results. If the melt flow rate is higher than about 300 g/10 min, low molding strength again results because the matrix resin has a low molecular weight, although the glass fibers are suitably dispersed in the molding. An optimal melt flow rate of the modified polypropylene resin is within the range of about 80 to about 150 g/10min.

Master batch pellets of the long glass fiber reinforced polypropylene resin in accordance with the present invention are obtained in such a manner that the above-described continuous reinforcement glass fiber bundles are impregnated with the above-described modified polypropylene resin while being drawn and are cut in the direction perpendicular to the direction in which the fibers are drawn. Any method may be used to impregnate the fiber bundles with the resin. For example, the impregnation method may involve any of the following methods: impregnating the glass fiber bundles with an emulsion of the modified polypropylene resin so that the emulsion is attached to the entire surface of the fibers, and thereafter drying the emulsion; attaching a suspension of the modified polypropylene resin to the glass fibers, drying the suspension and thereafter heat-melt-impregnating the fiber bundles with the resin; charging the glass fibers to attach a powder of the modified polypropylene resin to the glass fibers and thereafter heat-melt-impregnating the fibers with the resin; impregnating the glass fiber bundles with a solvent in which the modified polypropylene resin is dissolved, and thereafter removing the solvent; heating a mixture of the modified polypropylene resin and the continuous glass fibers so that the glass fiber bundles are impregnated with the molten modified polypropylene resin; impregnating the glass fiber bundles with the modified polypropylene resin heated and melted while opening the glass fibers on a bar, a roll and a die; or other methods. Among these methods, the method of impregnating the fiber bundles with the modified polypropylene resin heated and melted while opening the glass fibers on a bar, a roll and a die is most preferable because of the simplicity of the apparatus and process involved.

In master batch pellets thus formed and cut, the glass fibers extend completely through the pellet length in one direction in parallel with each other. The pellets contain about 60 to about 90 wt % of the glass fibers. The pellet length is about 2 to about 50 mm in the direction along the fibers. If the glass fiber content is smaller than about 60 wt %, the above-mentioned advantages of the master batch are significantly reduced. Furthermore, the product application range of a molding comprising such pellets after dilution is restricted and the industrial value of the product is thereby reduced. If the glass fiber content is higher than about 90 wt %, the glass fiber bundles cannot be sufficiently impregnated with the resin and it is difficult to obtain the desired product. The glass fiber content is, preferably, within the range of about 70 to about 85 wt %. If the pellet length is smaller than about 2 mm, the glass fiber length in the product is so short that the molding strength, particularly the strength against impacts, is reduced. If the pellet length is larger than 50 mm, clogging in the hopper and mixture segregation of the master batch with a polypropylene resin takes place during injection molding or extrusion. The pellet length is, preferably, about 3 to about 25 mm. Any pellet shape is acceptable as long as the length is about 2 to about 50 mm. For example, the pellets may be circular, elliptic or rectangular in section. Preferably, the longitudinal length of a cross section of the pellets is such that the aspect ratio (the ratio of the pellet length and the cross section length) is about 1 to 10.

A diluting polypropylene resin to be mixed with the master batch pellets of the long glass reinforced polypropylene resin used in accordance with the present invention comprises about 70 wt % or more of polypropylene as a constituent unit. Examples include: propylene homopolymers, copolymers containing less than about 30 wt % of vinyl group containing monomer copolymerizable with propylene and about 70 wt % or more of propylene, and mixtures of these. Examples of such copolymers are propylene-ethylene random copolymers, propylene-ethylene block copolymers, propylene-butene copolymers, and propylene-EPDM copolymers. The melt flow rate of these diluting polypropylene resins is not particularly limited. However, melt flow rates lower than about 1 g/10 min reduce fluidity to where moldability is disadvantageously reduced. Melt flow rates exceeding about 200 g/10 min reduce molding strength after dilution, particularly strength against impacts. Preferably, the melt flow rate is within the range of about 5 to about 150 g/10 min.

Diluting polypropylene resins may be selected according to purposes for which moldings are used. For thin moldings, those having a high fluidity, i.e., a melt flow rate of about 30 to about 100 g/10 min, are suitable. If substantially high impact resistance is required, it is preferable to use ethylene-propylene block copolymer having a melt flow rate of about 3 to about 20 g/10 min and containing about 10 to about 30 wt % of ethylene, or propylene-EPDM copolymer having a melt flow rate of about 3 to about 20 g/10 min and containing about 10 to about 30 wt % of EPDM.

If a long fiber reinforced ethylene-propylene block copolymer or propylene-EPDM copolymer molding is produced in a prior art manner, and if high impact resistance is required, impregnation of the glass fibers is difficult because of the high melt viscosity of ethylene-propylene block copolymer or propylene-EPDM copolymer. Accordingly, the present invention method of molding a mixture of the above-described master batch and a like high-impact-resistance copolymer is remarkably effective.

The weight ratio of the long glass fiber reinforced polypropylene master batch to the diluting polypropylene resin in the mixture in accordance with the present invention is about 5/95 to about 70/30. If the proportion of the master batch in the mixture is smaller than about 5 wt %, the glass fiber content in a molding after dilution is so small that the high strength/impact resistance advantage of a long fiber reinforced molding is not sufficiently exhibited. If the proportion of the master batch is larger than about 70 wt %, that is, if the proportion of the diluting polypropylene resin is smaller than about 30 wt %, the economic advantage gained by using the diluting polypropylene is reduced. Furthermore, the product application range of the resulting molding is restricted, so that the industrial value of the molding is reduced. An optimal master batch/polypropylene weight ratio is within the range of about 20/80 to about 50/50.

The shape of the diluting polypropylene is not particularly limited. However, it is preferable to provide the diluting polypropylene in the form of pellets. More preferably, the size and shape of pellets of the diluting polypropylene are close to those of the master batch pellets. If the size of the pellets of the two materials greatly differ from each other, the two materials separate from each other in a hopper during melt molding. Preferably, the polypropylene resin has the shape of grains having a diameter of about 2 to about 5 mm or a cylindrical shape having a diameter of about 1 to about 5 mm and a length of about 1 to about 10 mm.

Various additives may be added to the mixture for melt process moldings in accordance with the present invention. Examples of such additives are antioxidants, such as phenolic and phosphoric antioxidants, ultraviolet absorbers, dyestuffs or pigments for coloring, higher fatty acid, metallic salts of higher fatty acid, fatty amide, and lubricants such as waxes.

Examples of melt processes for molding the mixture in accordance with the present invention include an ordinary injection molding machine, an injection-press molding machine, a single screw extruder, a double screw extruder, a hot pressing machine or the like. Examples of moldings thereby obtained include ordinary injection moldings, rod-like moldings formed by contour extrusion, plate-like moldings formed by contour extrusion, sheets and the like.

The average (median length) of the permanent length of fibers in a molding obtained by melting and molding the mixture of the above-described master batch and polypropylene resin is preferred to be about 0.8 to about 10 mm.

If the median length is smaller than about 0.8 mm, the advantages of long fiber reinforced moldings such as high strength, large elastic modulus, improved creep characteristics and improved vibration fatigue characteristics cannot be adequately realized.

At a median length of about 10 mm, the limits of the above-mentioned benefits associated with long fiber reinforced moldings are reached and external appearance deterioration begins to occur.

In order to maintain the average permanent glass fiber length at about 0.8 to about 10 mm, it is preferred that a comparatively moderate melt molding condition be set for the melt process molding mixture of the present invention, i.e., a smaller kneading force which reduces the shearing force applied to the molten resin.

For example, it is preferred that a deep-root screw be employed to set the back pressure of the screw to a minimum value of about 0 to about 3 kg/cm$^2$. Alternatively, a method of reducing the screw revolutions may be used. An advantage of the present invention is that the glass fibers in the melt process molding mixture can be sufficiently dispersed with a reduced kneading force.

According to the present invention, high-strength melt process moldings can be obtained for the following reason. The content of long glass fibers in the master batch is large and the adhesion between the glass fibers and the polypropylene resin in the master batch is improved by surface finishing of the glass fibers and modification of the polypropylene resin. Further, it is thought that the polypropylene of the master batch can disperse easily in the diluting polypropylene because the master batch polypropylene, having strong bonds around the surfaces of the glass fibers and having high fluidity, has an affinity with the diluting polypropylene and has its apparent viscosity reduced at the time of melting and molding.

Accordingly, it is thought that a molding having a higher strength can be obtained even when the melt flow rate of the master batch polypropylene is high, if the melt flow rate of the diluting polypropylene is reduced.

EXAMPLES

The following examples are merely illustrative and are not intended to define or limit the scope of the invention, which is defined in the appended claims.

(Examples 1 to 5)

A mixture of 100 parts by weight of polypropylene homopolymer having a melt flow rate of 8 g/10 min, 2 parts by weight of maleic anhydride and 0.3 parts by weight of 2,5-dimethyl-2,5-di(t-butylperoxy)hexyne–3 was melted and kneaded at 180° C. and extruded by a bent double screw extruder to obtain a maleic anhydride-modified polypropylene having a melt flow rate of 120 g/10 min and a grafted maleic anhydride content of 1.2 wt %.

Mixtures of 20 wt % of the modified polypropylene resin obtained in this manner and 80 wt % of polypropylene homopolymers having melt flow rates of 60 g/10 min (Example 1), 80 g/10 min (Example 2), 120 g/10 min (Example 3), 200 g/10 min (Example 4), and 300 g/10 min (Example 5) were melted and kneaded at 220 ° C. and were poured into an impregnation bath in which five metallic rolls were disposed and which was maintained at a temperature of 280° C. Five bound glass rovings, each of which contained about 2320 glass filaments surface-finished with a finishing agent containing 0.2 wt % of γ-aminopropyltriethoxysilane and having a diameter of 16 μm (total number of filaments: about 11600) were alternately passed along the five rolls in the molten resin of the impregnation bath, and a tensile force of about 2 kg was applied to the rovings, thereby drawing the rovings at a speed of 1 m/min (residence time: 30 seconds). The glass filaments opened on the rolls, thereby impregnating the glass fiber rovings with the resin. The glass fiber rovings impregnated with the resin were passed through a die, cooled and thereafter cut into 10 mm pellets with a cutter. The pellets were incinerated in a muffle furnace at 450° C. for 8 hours, and the glass content was measured at 75 wt %. The incinerated pellets contained glass fibers extending parallel to each other having the same length as the pellets. Melt flow rates of molten resin samples from the impregnation bath were measured at 82 g/10 min, 95 g/10 min, 125 g/10 min, 190 g/10 min, and 280 g/10 min.

The above-obtained master batch pellets, containing 75 wt % of glass fibers, were mixed with homopolymer polypropylene resin pellets having 3 mm diameter grains and a melt flow rate of 45 g/10 min in a respective 53.3 wt %/46.7 wt % ratio, and the mixture was injection-molded by a 50t clamping force injection molding machine. Injection molding was conducted at a temperature of 240° C., with the mold temperature at 60° C. Table 1 shows the results of tensile strength (ASTM D-638) and Izod impact strength (ASTM D-256, notched) measurements taken on the obtained moldings.

TABLE 1

| | Melt Flow Rate of Master Batch Matrix Resin (g/10 min) | 40 wt % Glass Fiber Reinforced Molding after Dilution | |
| --- | --- | --- | --- |
| | | Tensile Strength (kg/cm$^2$) | Izod Impact Strength (kg · cm/cm) |
| Example 1 | 82 | 1140 | 37 |
| Example 2 | 95 | 1190 | 39 |
| Example 3 | 125 | 1250 | 33 |
| Example 4 | 190 | 1230 | 26 |
| Example 5 | 280 | 1080 | 23 |
| Comparative Example 1 | 27 | 610 | 20 |
| Comparative Example 2 | 34 | 700 | 21 |
| Comparative Example 3 | 50 | 860 | 22 |
| Comparative Example 4 | 60 | 960 | 24 |
| Comparative Example 5 | 350 | 790 | 21 |
| Comparative Example 6 | 125 | 450 | 18 |

(Comparative Examples 1 to 6)

For Comparative Examples 1–5, the same process as that of Example 1 was performed except that the melt flow rates of polypropylene resins mixed and kneaded as impregnation resins with the maleic anhydride polypropylene resin were 3.5 g/10 min (Comparative Example 1), 12 g/10 min (Comparative Example 2), 30 g/10 min (Comparative Example 3), 45 g/10 min (Comparative Example 4), and 400 g/10 min (Comparative Example 5).

For Comparative Example 6, the same process as that of Example 3 was performed except that non-finished glass fibers were used.

The melt flow rate of each of the polypropylene resins provided as master batch matrix resins in Comparative Examples 1 to 5 was outside of the range of 70 to 300 g/10 min. Accordingly, the glass fibers were not uniformly dispersed, and both the tensile strength (kg/cm$^2$) and the Izod impact strength (kg.cm/cm) of the moldings of Comparative Examples 1 to 6 were much smaller than those of Examples 1 to 5.

In Comparative Example 6, wettability of the unfinished glass fibers with polypropylene resin was low. Hence, the glass fibers were not suitably impregnated with the polypropylene resin, causing tensile and Izod impact strength reductions.

(Examples 6 to 10, Comparative Example 7)

For Examples 6–10 and Comparative Example 7, the same experiment as that of Example 3 was conducted except that the impregnation molten resin composition was selected so that maleic anhydride polypropylene resin/polypropylene resin ratios were, by weight, 0/100 (Comparative Example 7), 2/98 (Example 6), 5/95 (Example 7), 10/90 (Example 8), 50/50 (Example 9) and 0/100 (Example 10). Table 2 shows the results of this experiment.

TABLE 2

| | Maleic Anhydride Content in Master Batch Matrix Resin (wt %) | 40 wt % Glass Fiber Reinforced Molding after Dilution | |
| --- | --- | --- | --- |
| | | Tensile Strength (kg/cm$^2$) | Izod Impact Strength (kg · cm/cm) |
| Example 6 | 0.024 | 1230 | 27 |
| Example 7 | 0.06 | 1240 | 27 |
| Example 8 | 0.12 | 1250 | 27 |
| Example 9 | 0.60 | 1250 | 27 |
| Example 10 | 1.2 | 1240 | 27 |
| Comparative Example 7 | 0 | 580 | 20 |

In Comparative Example 7, no chemical bonding between polypropylene and the coupling agent on the glass fiber surface occurred since polypropylene containing no maleic anhydride was used. Consequently, the resulting tensile strength and impact strength were small.

(Comparative Examples 8, 9, Examples 11 to 14)

In Comparative Example 8, a combination of 40 wt % of chopped strands obtained by cutting to 3 mm the glass rovings used in Example 3, 12 wt % of the modified polypropylene resin used in Example 3, and 48 wt % of the polypropylene resin used in Example 3 having a melt flow rate of 120 g/10 min was mixed and kneaded at 270° C. and extruded by a double screw extruder to obtain cylindrical pellets having a length of 10 mm and a diameter of 3 mm. The pellets were injection-molded and physical characteristics of the moldings were measured in the same manner as Example 3. Additionally, the injection moldings were incinerated in a muffle furnace, and the average glass fiber length was determined.

The same process as that of Example 3 was conducted except that the length of the long-glass fiber reinforced polypropylene pellets were cut to 1 mm (Comparative Example 9), to 2 mm (Example 11), to 5 mm (Example 12), to 30 mm (Example 13), and to 50 mm (Example 14). The average length of glass fibers in the resulting injection moldings was also determined. Table 3 shows the result of this experiment.

TABLE 3

| | Average Length of Glass Fibers in Injection Molding (mm) | 40 wt % Glass Fiber Reinforced Molding after Dilution | |
|---|---|---|---|
| | | Tensile Strength (kg/cm$^2$) | Izod Impact Strength (kg · cm/cm) |
| Example 11 | 0.98 | 1220 | 20 |
| Example 12 | 1.2 | 1240 | 25 |
| Example 13 | 5.0 | 1250 | 27 |
| Example 14 | 8.2 | 1250 | 28 |
| Comparative Example 8 | 0.25 | 720 | 9 |
| Comparative Example 9 | 0.52 | 960 | 12 |

In Comparative Example 8, the glass fibers were cut during kneading and the resulting shortened fiber length caused a reduction in strength. In Comparative Example 9, the pellet length of 1 mm was half that used in the invention, resulting in tensile strength reduction and a sharp decline in impact strength.

(Examples 15 to 17, Comparative Examples 10 to 12)

For Examples 15–17 and Comparative Examples 10–12, the mixture ratio of the long fiber reinforced polypropylene resin used in Example 3 and a propylene-EPDM copolymer containing 30 wt % of EPDM (melt flow rate: 10 g/10 min) was varied, while the injection moldings and subsequent physical property evaluations were performed in the same manner as Example 3. Table 4 shows the results of this experiment.

batch in the mixture was so large that tensile strength was lost and a dramatic reduction in impact strength occurred.

In the prior art, moldings obtained by melting and molding a mixture of a long fiber reinforced polypropylene resin having a large glass fiber content and another polypropylene resin created non-uniform glass fiber dispersion and a resulting strength deficiency. According to the present invention, a mixture of a long glass fiber reinforced polypropylene master batch and a polypropylene resin is prepared in such a manner that glass fibers are treated with a coupling agent, and a modified polypropylene resin having a very low viscosity is used as a matrix resin in the master batch. As a result, uniform glass fiber dispersion occurs even when the master batch has a large glass fiber content, thereby making it possible to form a strong molding having an improved external appearance. Thus, in accordance with the present invention, many types of long glass fiber reinforced moldings serving various uses and purposes can be produced easily and at a low cost from only one long glass fiber reinforced polypropylene master batch having a large glass fiber content by changing the kind of diluting polypropylene resin or by changing the mixture ratio.

What is claimed is:

1. A mixture for melt process moldings prepared in such a manner that a glass fiber reinforced polypropylene resin obtained by impregnating a bundle of continuous glass fibers with a resin while drawing the bundle of fibers is used as a master batch and a resin is added to the master batch, said mixture essentially consisting of:

about 5 to about 70 wt % of a master batch of pellets formed by cutting a glass fiber reinforced polypropylene resin which is prepared in such a manner that a bundle of continuous reinforcement glass fibers surface-finished with a finishing agent containing a coupling agent is impregnated with a modified polypropylene resin having a functional group capable of chemically bonding with the coupling agent and having a melt flow rate of about 70 to about 300 g/10 min (ASTM D-1238, load: 2.16 kg, temperature: 230° C.) while the bundle of glass fibers is being drawn, said pellets having a length of about 2 to about 50 mm in the direction along the fibers, the glass fibers in said pellets extending uniformly in parallel with each other through a distance substantially equal to the length of said pellets; and about 30 to about 95 wt % of polypropylene resin to dilute said master batch.

2. The mixture according to claim 1 wherein said pellets have a glass fiber content of about 60 to about 90 wt %.

TABLE 4

| | Mixing Ratio (Weight) | | Molding after Dilution | | |
|---|---|---|---|---|---|
| | Master Batch | Propylene-EPDM Copolymer | Glass Fiber Content in Molding (wt %) | Tensile Strength (kg/cm$^2$) | Izod Impact Strength (kg · cm/cm) |
| Example 15 | 10 | 90 | 7.5 | 580 | 60 |
| Example 16 | 50 | 50 | 37.5 | 1120 | 55 |
| Example 17 | 70 | 30 | 49 | 1180 | 48 |
| Comparative Example 10 | 3 | 97 | 2.3 | 220 | 62 |
| Comparative Example 11 | 80 | 20 | 60 | 1150 | 24 |
| Comparative Example 12 | 100 | 0 | 75.0 | 750 | 22 |

In Comparative Example 10, low tensile strength resulted from a glass fiber content so small that the long fiber reinforcement effect was insufficient. Conversely, in Comparative Examples 11 and 12, the proportion of the master 3. The mixture according to claim 1, wherein said coupling agent comprises at least one material selected from the group consisting of silane coupling agents and titanate coupling agents.

4. The mixture according to claim 1, wherein said modified polypropylene resin comprises at least one material selected from the group consisting of carboxylic acid-modified polypropylene resins, acid anhydride-modified polypropylene resins and epoxy-modified polypropylene resins.

5. The mixture according to claim 1, wherein said modified polypropylene resin is grafted with about 0.01 to about 5 wt % of modification monomer.

6. The mixture according to claim 4, wherein said modified polypropylene resin is grafted with about 0.01 to about 5 wt % of modification monomer.

7. The mixture according to claim 1 wherein said modified polypropylene resin comprises a polymer chain having as a unit constituent at least one material selected from the group consisting of propylene homopolymer and copolymers of about 30 wt % or less of a vinyl group containing monomer copolymerizable with propylene and about 70 wt % or more of propylene.

8. The mixture according to claim 4 wherein said modified polypropylene resin comprises a polymer chain having as a unit constituent at least one material selected from the group consisting of propylene homopolymer and copolymers of about 30 wt % or less of a vinyl group containing monomer copolymerizable with propylene and about 70 wt % or more of propylene.

9. The mixture according to claim 5 wherein said modified polypropylene resin comprises a polymer chain having as a unit constituent at least one material selected from the group consisting of propylene homopolymer and copolymers of about 30 wt % or less of a vinyl group containing monomer copolymerizable with propylene and about 70 wt % or more of propylene.

10. The mixture according to claim 1, wherein said coupling agent comprises an aminosilane coupling agent, and said modified polypropylene resin comprises at least one material selected from the group consisting of polypropylene homopolymer modified with about 0.02 to about 1.5 wt % of maleic anhydride and ethylene-propylene copolymers modified with about 0.02 to about 1.5 wt % of maleic anhydride and having an ethylene content of about 5 wt % or less.

11. The mixture according to claim 1, wherein the melt flow rate of said modified polypropylene resin measured by ASTM method D-1238 (load: 2.16 kg, temperature: 230° C.) is within the range of about 80 to about 150 g/10 min.

12. The mixture according to claim 1, wherein the glass fiber content of said pellets is within the range of about 70 to about 85 wt %.

13. The mixture according to claim 1, wherein the length of said pellets is within the range of about 4 to about 15 mm.

14. The mixture according to claim 1, wherein said polypropylene resin mixed with said pellets has a melt flow rate within the range of about 5 to about 150 g/10 min as measured by ASTM method D-1238 (load: 2.16 kg, temperature: 230° C.).

15. The mixture according to claim 1, wherein said polypropylene resin mixed with said pellets comprises at least one material selected from the group consisting of propylene homopolymer and copolymers of 30 wt % or less of a vinyl group containing monomer copolymerizable with propylene and about 70 wt % or more of propylene.

16. The mixture according to claim 15, wherein said copolymer of propylene and a vinyl group containing monomer copolymerizable with propylene comprises at least one material selected from the group consisting of ethylene-propylene block copolymer having an ethylene content of about 10 to about 30 wt %, EPDM-propylene copolymer having an EPDM content of about 10 to about 30 wt %, and a mixture of the ethylene-propylene block copolymer and the EPDM-propylene copolymer.

17. The mixture according to claim 1, wherein the content of said pellets is limited within the range of about 20 to about 50 wt % while the content of said polypropylene resin mixed with said pellets is limited within the range of about 80 to about 50 wt %.

18. A melt process molding obtained by melting and molding a melt process molding mixture consisting essentially of about 5 to about 70 wt % of a glass fiber reinforced polypropylene resin in the form of pellets as a master batch and about 30 to about 95 wt % of another polypropylene resin to dilute said master batch, said melt process molding containing glass fibers having an average length of about 0.8 to about 10 mm, said glass fiber reinforced polypropylene resin being prepared bundling continuous reinforcement glass fibers surface-finished with a finishing agent containing a coupling agent and impregnating the resulting bundle with a modified polypropylene resin having a functional group capable of chemically bonding with the coupling agent and having a melt flow rate of about 70 to about 300 g/10 rain (ASTM D-1238, load: 2.16 kg, temperature: 230° C.) while the bundle is being drawn, said pellets being formed by cutting said glass fiber reinforced polypropylene resin, said pellets having a length of about 2 to about 50 mm in the direction along the fibers, the glass fibers in said pellets extending uniformly in parallel with each other through a distance substantially equal to the length of said pellets, said pellets having a glass fiber content of about 60 to about 90 wt %.

* * * * *

UNITED STATES PATENT AND TRADEMARK OFFICE
CERTIFICATE OF CORRECTION

PATENT NO. : 5,514,745
DATED : May 7, 1996
INVENTOR(S) : Kenji Yoshino

It is certified that error appears in the above-indentified patent and that said Letters Patent is hereby corrected as shown below:

In Column 9, in Table 1, 2nd Column, 7th Row, please change "27" to --27--;
in Table 1, 2nd Column, 8th Row, please change "34" to --34--; and
in Table 1, 2nd Column, 9th Row, please change "50" to --50--.

In Column 11, in Table 4, 2nd Column, 8th Row, please change "100" to --100--;
in Table 4, 3rd Column, 7th Row, please change "20" to --20--; and
in Table 4, 3rd Column, 8th Row, please change "0" to --0--.

In Column 14, in Claim 18, line 35, after "prepared" please insert --by--.

Signed and Sealed this

Thirteenth Day of August, 1996

Attest:

BRUCE LEHMAN

*Attesting Officer*     *Commissioner of Patents and Trademarks*